United States Patent [19]

Winckler

[11] Patent Number: 4,700,823

[45] Date of Patent: Oct. 20, 1987

[54] CLUTCH WITH PYROLYTIC CARBON FRICTION MATERIAL

[75] Inventor: Peter S. Winckler, Birmingham, Mich.

[73] Assignee: Eaton Corporation, Cleveland, Ohio

[21] Appl. No.: 134,842

[22] Filed: Mar. 28, 1980

[51] Int. Cl.$^4$ .................. F16D 13/64; F16D 69/02
[52] U.S. Cl. .................. 192/107 M; 74/711; 188/251 A; 192/113 B; 428/367
[58] Field of Search .................. 192/107 M, 113 B; 188/251 A, 264 E; 74/711; 428/367, 368; 264/29.4

[56] References Cited

U.S. PATENT DOCUMENTS

| | | | |
|---|---|---|---|
| 3,261,440 | 7/1966 | Graham et al. | 192/113 |
| 3,624,717 | 11/1971 | Brubaker | 74/711 |
| 3,639,197 | 2/1972 | Spain | 188/251 A X |
| 3,730,320 | 5/1973 | Freeder et al. | 188/251 A X |
| 3,738,901 | 6/1973 | Matsushima et al. | 192/107 M X |
| 3,738,906 | 6/1973 | Olcott | 428/367 X |
| 3,831,462 | 8/1974 | Baremor | 74/711 |
| 3,895,084 | 7/1975 | Bauer | 264/29 |
| 3,897,582 | 7/1975 | Olcott | 428/114 |
| 3,900,675 | 8/1975 | Olcott | 428/367 |
| 3,927,241 | 12/1975 | Augustin | 192/107 M X |
| 3,944,686 | 3/1976 | Froberg | 427/228 |
| 3,948,363 | 4/1976 | Ely | 188/251 A X |
| 3,991,248 | 11/1976 | Bauer | 428/245 |
| 4,029,829 | 5/1977 | Weaver et al. | 423/447.3 X |
| 4,029,844 | 6/1977 | Olcott | 428/367 |
| 4,187,932 | 2/1980 | Zarembka | 192/107 M X |
| 4,256,801 | 3/1981 | Chuluda | 192/107 M |
| 4,291,794 | 9/1981 | Bauer | 192/113 B X |

OTHER PUBLICATIONS

"Relationship between Structure and Strength for CVD Carbon Infiltrated Substrates", Bauer & Kotlensky, Oct. 1970.
"Pyrolytic Graphite", Smith & Leeds, 1970.

*Primary Examiner*—Rodney H. Bonck
*Attorney, Agent, or Firm*—D. A. Rowe; P. S. Rulon

[57] ABSTRACT

Disclosed is a locking differential (10) including an oil lubricated clutch assembly (18) having a plurality of interleaved friction discs (48, 50, 60, and 62) formed of steel and squeezed together to retard relative rotation of differential side gears (32 and 34). Adjacent friction discs have mutually facing friction surfaces. One of each mutually facing friction surface is defined by the metal forming the disc and the other surface is defined by a pyrolytic carbon composite friction material (78). In one form, the friction material includes a meshed cloth substrate formed of carbon fibers, which may be woven into a single layer of cloth, and a coating of carbon deposited on the fibers by chemical vapor deposition to a level forming a friction material having a relatively open mesh which is readily penetrated by an adhesive to improve bonding of the friction material to the discs.

44 Claims, 14 Drawing Figures

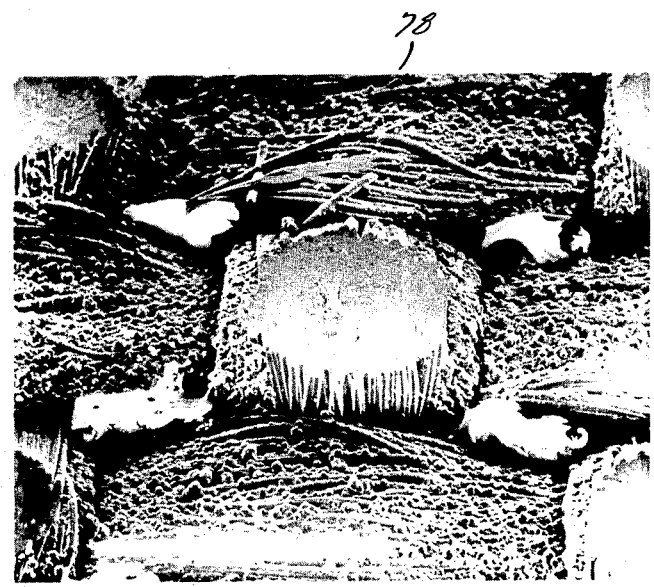
_Fig. 11._ 50X
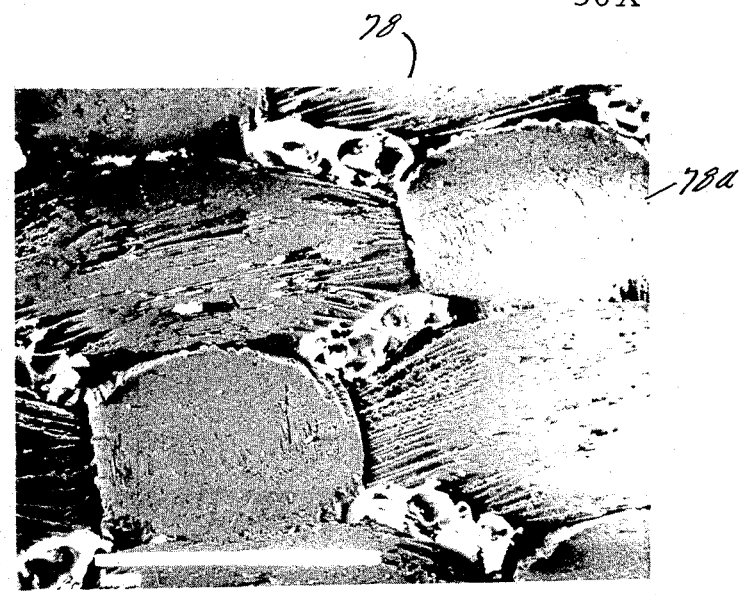
_Fig. 12._ 50X

CLUTCH WITH PYROLYTIC CARBON FRICTION MATERIAL

FIELD OF THE INVENTION

This invention relates to a friction material for clutches and brakes and, in particular, to a friction material for wet clutches and brakes. The invention further relates to a friction material for use in limited slip or locking differentials and for use in hoist load brakes.

BACKGROUND OF THE INVENTION

Several of the many desirable characteristics sought in a friction material are low cost, high wear resistance, high heat resistance, high coefficients of friction, consistent coefficients of friction over a wide heat and load range and time periods, and close or identical static and dynamic coefficients of friction. Wide differences in static and dynamic coefficients of friction are believed by some to cause or exist conincident with the phenomenon of stick-slip or chatter in clutches and brakes. The friction material of the present invention is relatively inexpensive, exhibits a high level of these desirable characteristics, and eliminates or virtually eliminates chatter when used in wet clutches and brakes.

A form of the friction material of the present invention is illustrated for use in a locking differential of the type disclosed in U.S. Pat. No. 3,831,462, issued to Jerry F. Baremor and a limited slip differential of the type disclosed in U.S. Pat. No. 3,624,717, issued to Richard K. Brubaker. The Baremor differential includes a multiple disc friction clutch which is applied to retard relative rotation between driven axles only when the relative rotation exceeds a predetermined level. The Brubaker differential includes a pair of multiple disc friction clutches which are continuously applied be relatively light spring forces and by parting forces acting between the differential side gears and pinions. These types of differentials, broadly referred to as locking and limited slip differentials, have long suffered from the annoying problem of clutch chatter; this problem is particularly well-known in the limited slip differentials.

The friction material of the present invention is readily traced to the Aerospace Industry. Aerospace needs, particularly in the past three decades, have fostered the development of many exotic materials which are commerically successful in the aerospace industry but which fail to achieve commercial success in other industries due to the high cost, e.g., the automotive industry. One such material has been high carbon density composite material produced by chemical vapor deposition (CVD) of carbon or graphite on a precursor cloth substrate. The substrate may be a felt or a woven fabric composed of carbon or graphite.

Carbon materials produced by CVD are generally referred to as pyrolytic carbon or graphite. Herein, carbon and graphite materials produced by CVD on a carbon or graphite cloth will be referred to as pyrolytic carbon composite material unless explicitly stated otherwise.

Since the 1950's, articles made of high density pyrolytic carbon composite materials have been used in aerospace applications requiring high strength at relatively high operating temperatures. Examples of such articles include radiation shields and rocket nozzles. These articles have been formed of multiple layers of a preshaped cloth substrate, e.g., 20 or more layers, CVD infiltrated for hundreds of hours to as high a density as could be obtained. The finished articles resemble a solid block of carbon in that they are relatively inflexible, are impervious to light, have the meshes of the cloth substrate completely filled or virtually filled with carbon deposited by CVD, and have a relatively smooth outer surface as free of pores as possible.

Since the late 1960's or early 1970's these same high density carbon composite materials have been recognized as excellent friction materials for dry aircraft brakes when the engaged friction surfaces are both formed of the composite material, i.e., composite material running on composite material. Herein a dry brake or clutch is defined as a brake or clutch wherein the friction surfaces are dry and a wet brake or clutch is defined as a brake or clutch wherein the friction surfaces are lubricated or cooled by direct contact with a liquid. Unsatisfactory levels of chatter were obtained with dry brakes having one friction surface of the composite material and the other of steel or iron.

In spite of the excellent results obtained in the dry brake use of the pyrolytic carbon composite material, the material has not found widespread use in clutches and brakes outside the aerospace industry. One reason for this lack of commercial success outside of the aerospace industry is believed to be related to, if not solely due to, the material's high cost compared to other friction materials. A substantial portion of this high cost is due to the great many hours (both total and labor hours) required to successfully CVD infiltrate the multiple layers of cloth substrate to the high carbon density believed necessary for use of the material as a friction material. Further, since satisfactory results could only be obtained by running composite material against composite material, the amount of material required was effectively doubled.

U.S. Pat. No. 3,991,248, issued to Dieter W. Bauer in 1975, provides one example of the time-consuming process for CVD infiltrating multiple layers of cloth substrate to a high carbon density. As taught in the Bauer patent, the substrate may consist of multiple layers of a rayon precursor graphite cloth. The cloth layers are abraded on both sides to raise the nap of the cloth, cut into a desired shape, and stacked in layers in a compacting fixture. The cloth is then CVD infiltrated for as much as several hundred hours in a batch furnace. The CVD carbon infiltrated between the layers provides a matrix penetrated by the nap fibers to increase the layer-to-layer bond or shear strength between the layers. More specifically, as shown in Example 1, Sample 5, of the Bauer patent, twenty-five layers of abraded cloth are cut into annular discs having an O.D. of 3.650 inches (9.271 cm) and an I.D. of 0.750 inches (1.905 cm) and then stacked in the fixture of FIG. 1. The layers are compacted or compressed by the fixture to a total substrate thickness of 0.350 inches and then CVD infiltrated for ten hours and then for 160 hours. The ten-hour infiltration run, according to Table 2, increased the density from 0.717 grams per cubic centimeter to 1.070 grams per cubic centimeter, a carbon density increase of 0.0253 grams per cubic centimeter per hour of infiltration time. The 160-hour infiltration run increased the density from 1.070 grams per cubic centimeter to 1.590 grams per cubic centimeter, a carbon density increase of only 0.00325 grams per cubic centimeter per hour of infiltration time. Between infiltration runs the partially infiltrated substrate was removed from the fixture and machined on all of its sides to remove bottleneck pores which prevent or impede further infiltration. After machining, the substrate was ultrasonically cleaned in acetone prior to continued infiltration.

U.S. Pat. No. 3,897,582, issued to Eugene L. Olcott in 1975, provides a second example of a process for making a pyrolytic carbon composite friction material for an aircraft brake. The material is formed by progressively positioning a continuous or a plurality of continuous refractory strands on a heated mandrel and simultaneously pyrolyzing pyrolysis gases onto the strand(s) at about the point of positioning contact of the strand(s) on the mandrel or on previously positioned strands to nucleate pyrolytic graphite. One object of this process is to provide a material having few or a minimum number of voids or pores which substantially reduce the density of the material.

The pyrolytic carbon composite materials produced by the processes of U.S. Pat. Nos. 3,991,248 and 3,897,582, like the composite materials produced for radiation shields and rocket nozzles, resemble solid blocks of carbon in that they are relatively inflexible, impervious to light, have few, if any, through pores, and have relatively small surface pores.

Applicant has discovered that pyrolytic carbon composite material having multiple layers of cloth substrate highly densified by CVD infiltration provides chatter-free results when run against a metal, such as steel or iron, in a wet clutch or brake. This discovery reduces the amount of composite material required for a given clutch or brake and therefore reduces costs. The material, when used in wet clutches and brakes, seems to be insensitive to the type of lubricating or cooling oil used. For example, many friction materials are relatively chatter-free when used with extreme high pressure oils but chatter unacceptably when used with light pressure oils.

Applicant has further discovered, that in certain wet clutch and brake applications requiring relatively thin amounts of friction material in the range of 0.080 to 0.010 inches, the pyrolytic carbon composite material may be formed of a single porous layer of cloth substrate or two or three interwoven porous layers of fabric CVD infiltrated for relatively short periods of time compared to the infiltration time periods taught in the Bauer patent. In fact excellent results have been obtained with single layers of square weave fabrics CVD infiltrated for several minutes by a process taught in U.S. Pat. No. 3,944,686, issued to Robert W. Froberg.

The Froberg patent, which is incorporated herein by reference, discloses a process for making electrodes for use in fuel cells. The process, unlike the batch process in the Bauer patent, is a continuous process wherein relatively long strips of porous precursor cloth (felt or woven fabric) continuously moves through a CVD infiltrating furnace in conveyor belt fashion. When single layers of woven fabric are infiltrated by this process, or for that matter quickly infiltrated, the finished material is still porous and is readily recognized as a fabric, is relatively flexible for a given thickness compared to the highly densified material of Bauer U.S. Pat. No. 3,991,248, has open or unfilled meshes (i.e., through pores), and is pervious to light. The specific process for making this quickly infiltrated material forms no part of the present invention, e.g., the material may be made in batch process furnaces or continuous process furnaces.

A second process for making such electrode material is disclosed in British Patent Specification No. 1,455,891, published Nov. 17, 1976. The electrode material of this specification is made by batch furnace process but is otherwise the same as the material of Froberg U.S. Pat. No. 4,944,686. That is, both electrode materials are formed from a porous substrate on precursor membrane of carbon fibers. The precursor membrane may be characterized as having an open porosity, a mesh or open mesh, or through pores; herein these are synonymous terms which are collectively included in the term mesh. Both electrode materials are lightly densified or coated with pyrolytic carbon relative to the material of Bauer U.S. Pat. No. 3,991,248. The final density of this lightly densified material is of course a function of the bulk density of the precursor (i.e., compactness of the carbon fibers) and the amount of pyrolytic carbon deposited by chemical vapor deposition. The lightly densified material is, however, structurally distinguished from the highly densified material in that it retains a substantial amount of the porosity of the starting precursor relative to the highly densified material and retains a substantial amount of the mesh of the starting precursor, whereas the mesh of the highly densified material is virtually closed by pyrolytic carbon. Further, the lightly densified material retains a substantial amount of the compressibility of the starting pecursor, whereas the precursor of the highly densified material is rigidly incapsulated by a dense pyrolytic carbon matrix which is intended to increase structural strength and render the densified material virtually incompressibile when used as a friction material.

Tests of this relatively thin and quickly infiltrated material have provided excellent results in wet clutches and brakes having the material running against steel and against itself. Further, when formed of a single layer of woven fabric, this material seems to exhibit improved bonding characteristics when it is adhesively bonded to a support member such as a steel disc used in a limited slip differential.

SUMMARY OF THE INVENTION

An object of this invention is to provide an improved friction material for brakes and clutches.

Another object of this invention is to provide a friction material having improved operating characteristics in a wet clutch or brake.

Another object of this invention is to provide a friction material having a surface which improves the materials bonding to a support member.

Another object of this invention is to provide an improved friction material which virtually eliminates clutch chatter in locking and limited slip differentials.

According to a feature of the invention, the friction material includes a meshed cloth formed of carbon fibers and pyrolytic carbon deposited on the fibers by chemical vapor deposition to form a pyrolytic carbon composite friction material having a relatively open mesh.

According to another feature of the invention, a clutch or brake includes at least two members mounted for relative rotation and each having a friction surface rotatable therewith and confronting each other, means to frictionally engage the surfaces to retard the relative rotation, a cooling liquid in contact with the surfaces, and at least one of the surfaces being defined by a pyrolytic carbon composite friction material.

According to another feature of the invention, the members of the above clutch or brake are formed from metal and the other friction surfaces is defined by the metal surface of the other member.

According to another feature of the invention, the pyrolytic carbon composite friction material defining the one friction surface in the above two features is adhesively bonded to its respective member and includes a meshed cloth formed of carbon fibers and pyrolytic carbon deposited on the fibers by chemical vapor deposition to form a composite friction material having a readily visible mesh readily penetrated by the adhesive.

According to another feature of the invention, a differential includes a casing mounted for rotation in a liquid lubricant bath, first and second side gears mounted for rotation in the casing for rotation relative to each other and relative to the casing, first and second sets of interleaved metal discs, respectively, rotatable with the casing and at least one of the gears and having mutually facing friction surfaces, and means to functionally engage the mutually facing surfaces to retard the relative rotation; one of each of the mutually facing friction surfaces are defined by the metal of its respective disc and the other of each of the mutually facing surfaces are defined by a pyrolytic carbon composite friction material bonded to its respective disc; and the pyrolytic carbon composite friction material is defined by a single layer of woven fabric formed of carbon fibers and pyrolytic carbon deposited on the fibers by chemical vapor deposition.

BRIEF DESCRIPTION OF THE DRAWINGS

The preferred embodiments of the invention are shown in the accompanying drawings in which:

FIG. 3 is a sectional view of a side gear illustrated in FIG. 1;

FIGS. 9-12 are enlarged views of friction material bonded to the discs of the multiple disc clutch illustrated in FIGS. 7 and 8;

DETAILED DESCRIPTION OF THE DRAWINGS

Figure 13:
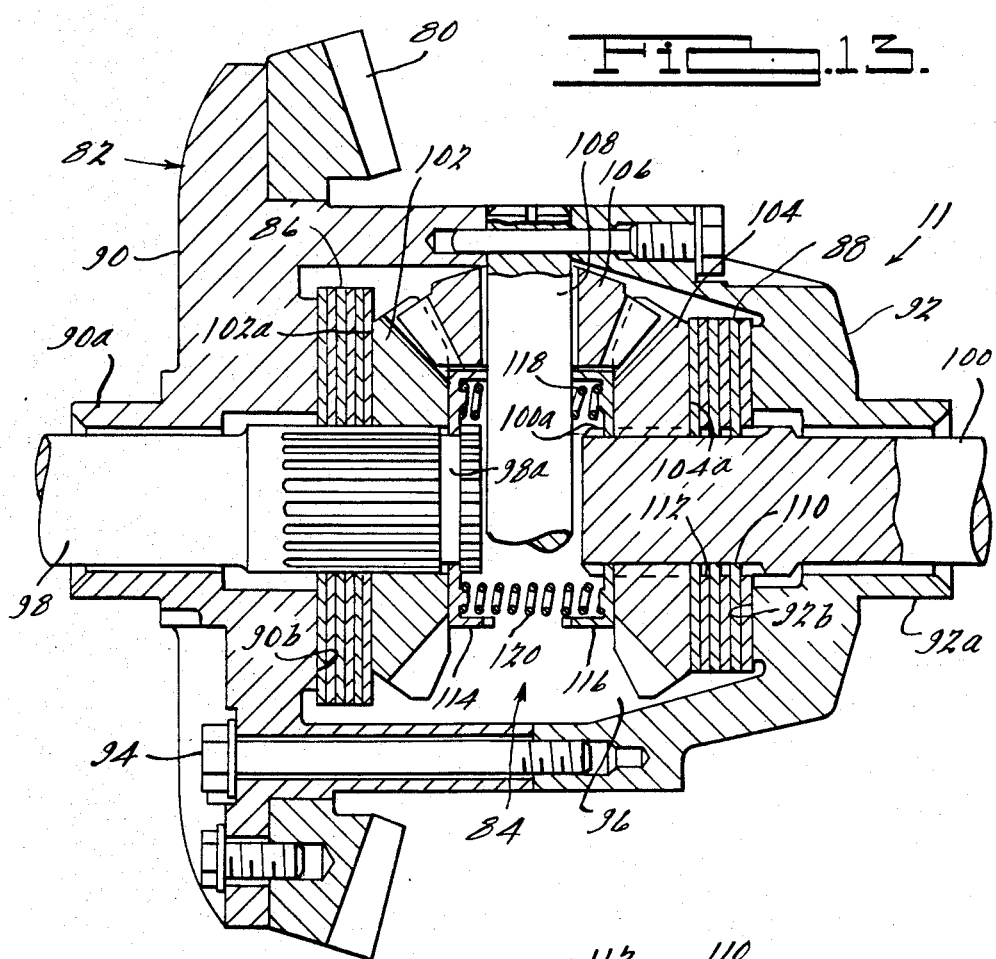
FIG. 13 is a plan view in partial section of a limited slip differential.
Figure 14:
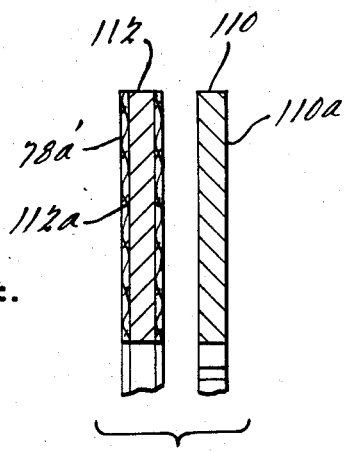
FIG. 14 is a partial view in section of two clutches discs in FIG. 13.

The friction material of the present invention is shown for use in the locking differential mechanism 10 of FIGS. 1-8 and in the limited slip differential 11 of FIG. 13. The differential mechanism 10 is of a type more fully described in U.S. Pat. No. 3,831,462 issued to Jerry F. Baremor. The differential mechanism 11 is of a type more fully described in U.S. Pat. No. 3,624,717 issued to Richard K. Brubaker. The specifications of these patents are hereby incorporated by reference into this application.

With respect to the Baremore mechanism, it should suffice to say that mechanism 10 is rotatably supported in an unshown differential housing, that the housing defines a reservoir containing an oil for lubricating the mechanism in a conventional manner, and that mechanism 10 includes an input ring gear 12 secured to a rotatable casing 14, a differential gear train 16, and a regenerative self-energizing clutch assembly 18. Casing 14 includes a pair of support portions adapted to be received for rotation in bearings of the differential housing, not shown. The casing further includes a wall 20 defining an annular thrust surface 22 and another wall 24. Walls 20 and 24 define a chamber 26 for gear train 16 and clutch 18.

The purpose of gear train 16 is to transmit rotary motion from casing 14 to a pair of output shafts 28 and 30. To accomplish this purpose, the gear train includes a pair of beveled side gears 32 and 34 and beveled pinion planetary gears 36 (FIG. 2) disposed between and in meshing engagement with the side gears. The side gears are retained against outward movement by a thrust sleeve 38 and thrust washers 40 and 42. Pinion gears 36 are rotatably supported by casing 14 by means of a pinion shaft 44 extending across the gear chamber 26.

Self-energizing clutch 18 is of the friction disc type and is operable between a disengaged condition wherein the axle shafts 28 and 30 are freely rotatable relative to each other and an engaged condition wherein the clutch 18 drivingly interconnects the axle shafts through casing 14 and gears 32, 34, and 36 to retard relative rotation therebetween. Clutch 18 includes two separate and distinct clutch portions. One portion is "active" to provide regenerative self-engaging forces for fully actuating the clutch mechanism while the other portion is "inactive" and merely increases total torque capacity after actuation.

Figure 1:
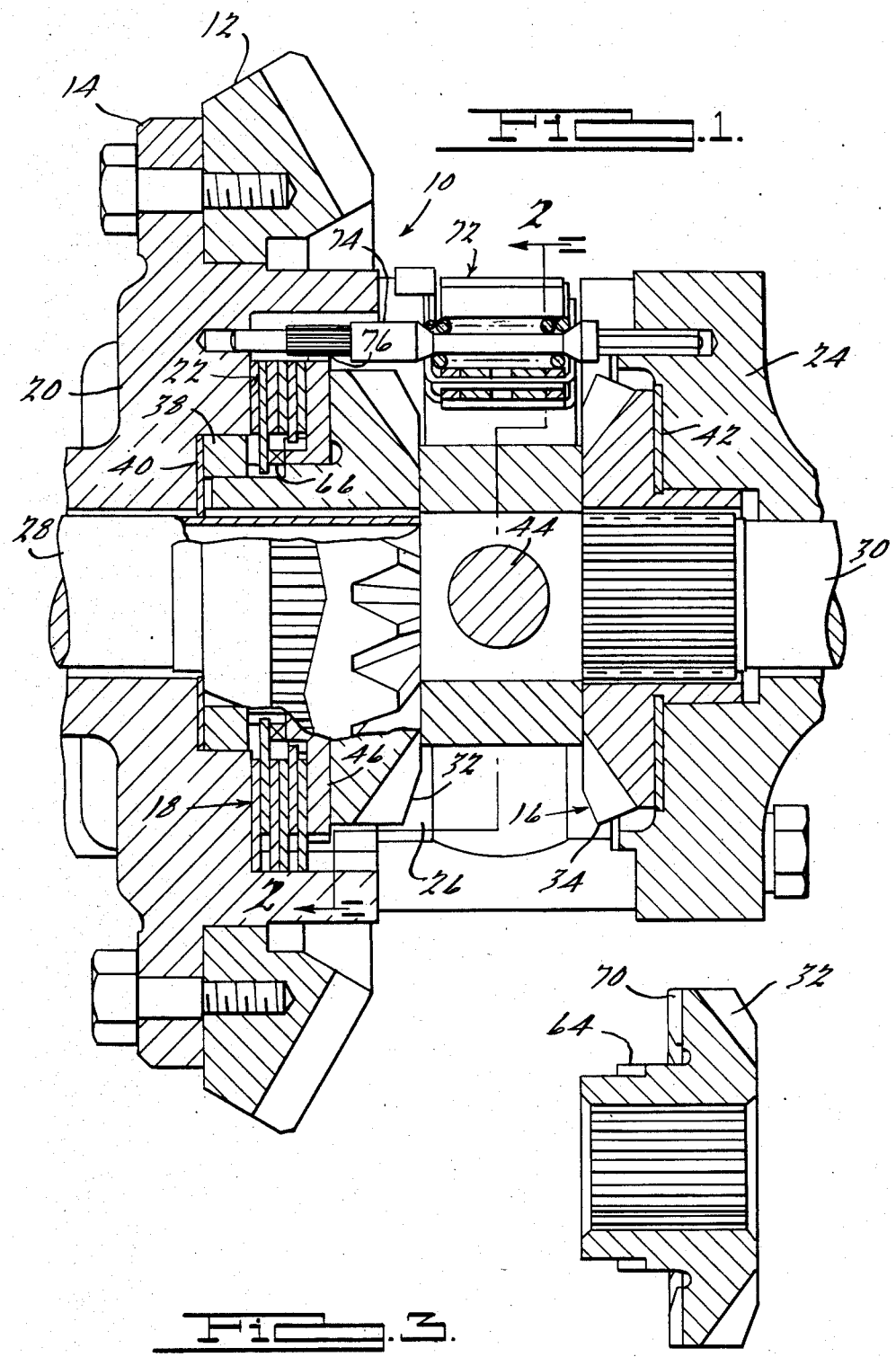
FIG. 1 is a plan view in partial section of a locking differential.
Figure 2:
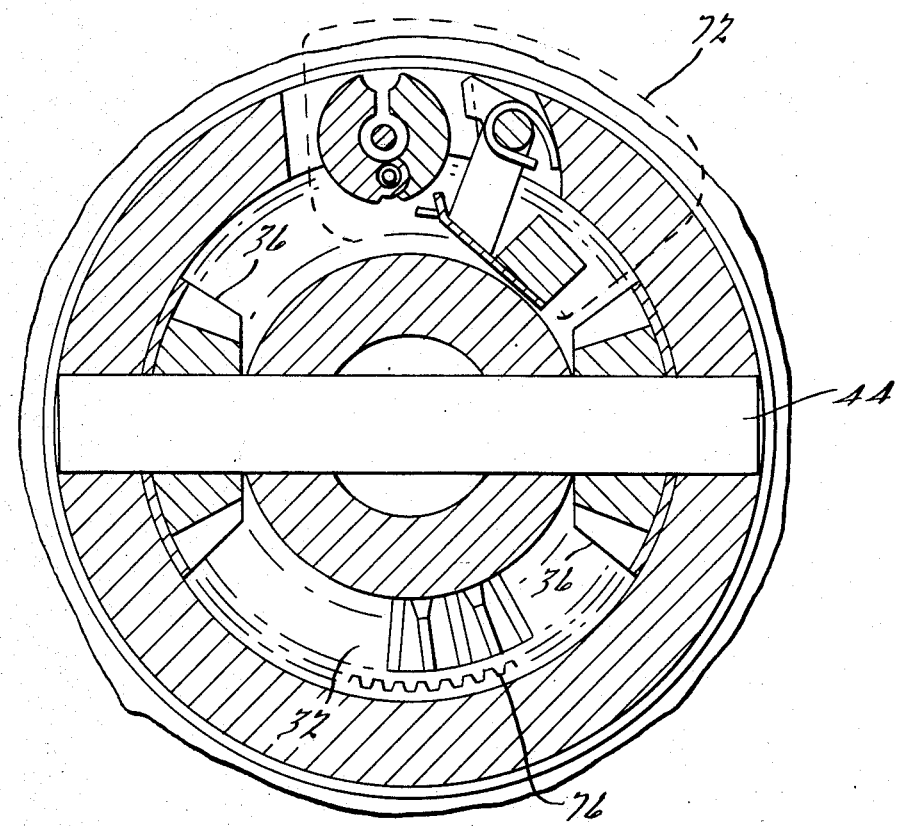
FIG. 2 is a sectional view taken substantially along lines 2—2 of FIG. 1.
Figure 4:
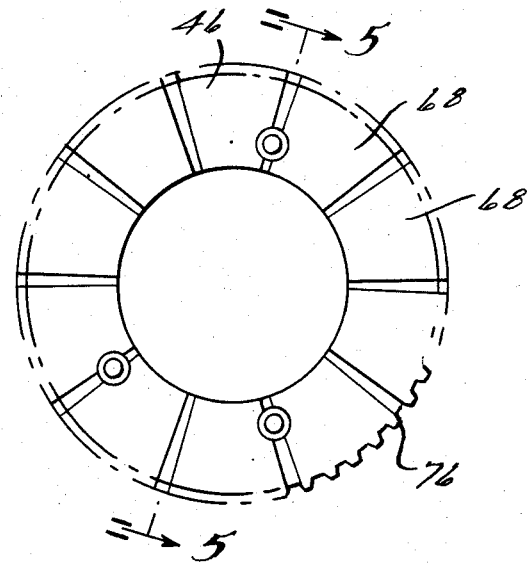
FIG. 4 is a plan view of a cam member illustrated in FIG. 1.
Figure 5:
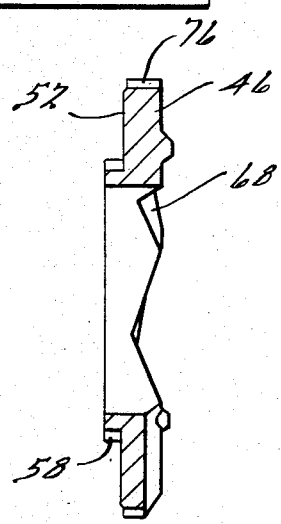
FIG. 5 is a sectional view taken along line 5—5 of FIG. 4.
Figure 7:
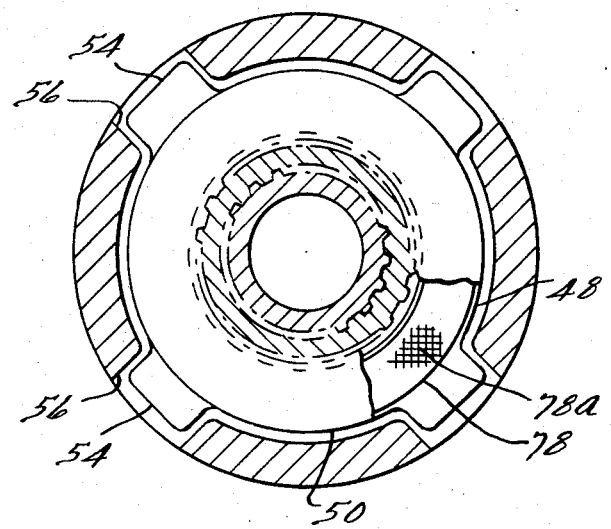
FIG. 7 is a sectional view of a multiple disc clutch illustrated in FIG. 1 and taken substantially along line 7—7 of FIG. 8.
Figure 6:
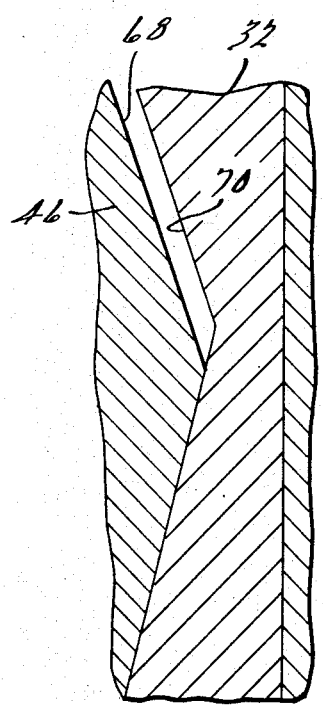
FIG. 6 is an enlarged partial view illustrating contact between wedge surfaces of the cam and side gear.
Figure 8:
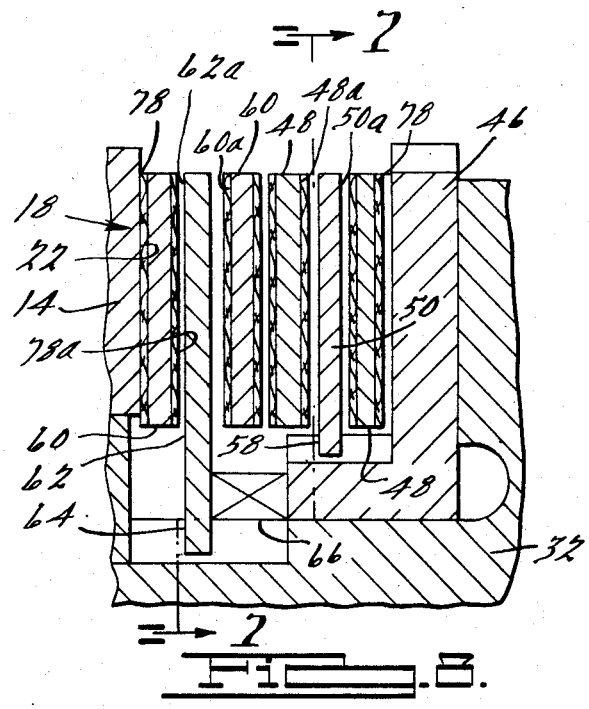
FIG. 8 is a fragmentary enlarged view of the clutch illustrated in FIG. 1.

The "active" portion (FIGS. 1 and 8) of clutch 18 includes a cam 46 and interleaved clutch discs 48 and 50. Cam 46 includes an annular thrust surface 52. For purpose of this disclosure, the cam will be considered as part of side gear 32. Clutch discs 48 are mounted for positive rotation with casing 14 by means of tabs 54 received in recesses 56 in casing 14 (FIG. 7). This particular mounting arrangement is more clearly shown in U.S. Pat. No. 3,052,137, issued to Robert c. Russell. Clutch discs 50 are mounted for positive rotation with cam 46 by means of a spline engagement 58. The "inactive" portion (FIGS. 1 and 8) of clutch 18 is provided to give increased torque transmitting capacity to the clutch and includes a plurality of alternatively interleaved discs 60 and 62. Discs 60 are generally identical in structure and mounting arrangement to discs 48 of the "active" portion and are likewise configured for positive rotation with casing 14. Discs 62 are mounted for positive rotation with side gear 32 by means of a spline engagement 64. In order to provide for smooth engagement of clutch 18, the number of "active" discs is preferably greater than two and less than ten as more fully discussed in U.S. Pat. No. 3,831,462. When clutch 18 is in the disengaged condition (FIG. 8), the friction surfaces of discs 48, 50, 60, and 62 do not prevent relative rotation of axle shafts 28 and 30. This enables casing 14 to be rotated relative to the side gears. A wave spring 66 is provided to insure such disengagement by forcing disc 62 leftward into contact with one of the discs 60 and cam 46 rightward.

Cam 46 is drivingly connected to side gear 32 by wedging ramp surfaces 68 and 70 formed on the cam and the side gear respectively (FIGS. 3 to 6). These surfaces 68 and 70 serve to move the friction discs 48, 50, 60, and 62 into engagement when relative rotational movement between the side gears and the casing is induced. When the friction discs are in a fully engaged position (FIG. 1), relative rotation is prevented by static friction forces acting between mutually facing surfaces on the discs.

An actuator 72 having a splined shaft 74 drivingly engaged in gear teeth 76 of cam 46 is mounted for rotation with casing 14. The actuator is of the type more fully described in U.S. Pat. No. RE 28,004, issued to William C. Ottemann. The specification of that patent is hereby incorporated by reference into this application. For the present, it is sufficient to state that when a predetermined rate of slip occurs betwee casing 14 and the side gears, actuator 72 is operable to retard cam 46 slightly relative to side gear 32, thereby squeezing the discs together.

Actuator 72 thus provides an initial actuating force which, although relatively small, is sufficient to retard movement of cam 46 relative to side gear 32 by virtue of the drive connection of the gear teeth 76 and the spline on shaft 74. The abutting engagement of the sloping portions of the same surfaces 68 against similarly sloping portions of the surfaces 70 of side gear 32 causes an axially directed force to be applied against cam 46 thus reducing the distance between thrust surfaces 22 and 52 and causing frictional engagement of the mutually facing surfaces of the discs. Since the initial actuating force is provided by actuator 72 and is insufficient by itself to effect operation of clutch 18, the self-energizing characteristic of clutch 18 is necessary to complete the lockup of side gear 32 relative to casing 14.

Discs 48, 50, 60, and 62 are flat steel discs which each, respectively, have relatively smooth, oppositely facing, annular surfaces 48a, 50a, 60a, and 62a. Surfaces 48a and 60a have a pyrolytic carbon composite material 78 bonded thereon to define annular friction surfaces 78a which in general run against mutually facing steel friction surfaces defined by surfaces 50a and 62a. Alternately, material 78 may also be bonded to surfaces 50a and 62a. However, since the space available for the discs is limited, it is desirable to make the discs as thin as possible so that the total disc assembly will contain as many discs as possible and thus provide more friction surface area; this is true for both locking differentials of the type disclosed herein and for limited slip differentials wherein the discs are continuously biased together. Hence, it is desirable to make the total amount of friction material as thin as possible.

Figure 9:
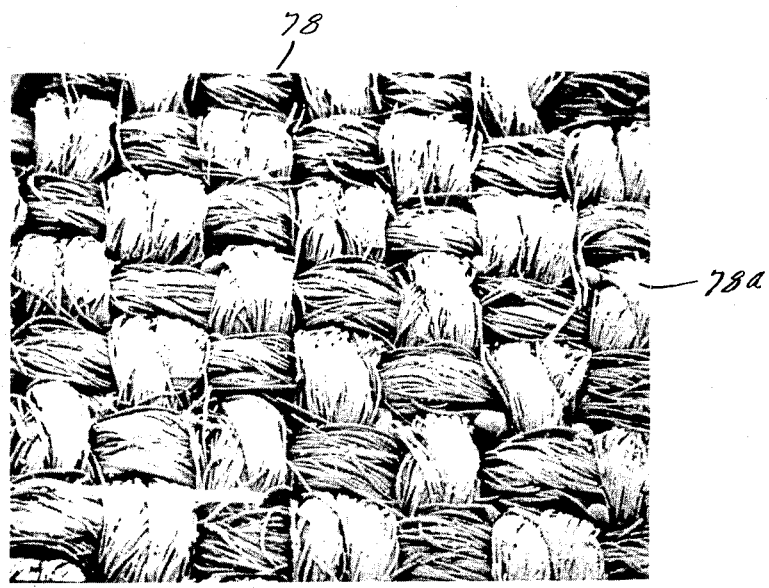
Figure 10:

Material 78 may be formed of multiple layers of carbon or graphite cloth substrate highly densified by CVD infiltration. However, the material is preferably formed of a single layer of carbon or graphite cloth substrate CVD infiltrated for relatively short periods of time. Samples of the material, bonded to steel discs, are shown in magnified views of FIGS. 9–12. The material in FIGS. 9 and 10 is unworn and that of FIGS. 11 and 12 is in two different stages of wear. The material in FIGS. 9 and 10 is a 0.016 inch thick, single layer, plain weave, Polyacrilonitrile (PAN) based, graphite fabric densified by the continuous process taught in the previously mentioned patent to Froberg and manufactured by the Minerals, Pigments and Metals Division of Pfizer, Inc. The coarse fabric texture of the material is readily discerned as well as the yarns and many of the fibers or filaments defining the yarns. FIGS. 9 and 10 clearly show the surface texture of the woven fabric and relatively large voids between the fibers of the fabric: Further, extruded adhesive is clearly visible between some of the mesh defined by the yarns. Preferably the adhesive penetrates the mesh but does not extrude completely through to the friction face of the material. The rather rough texture of the fabric and the open mesh are readily gripped by the adhesive to form a strong bond. Excellent bonds have been obtained with 3M Brand, AF15, High temperature Thermo-Set Adhesive applied 0.003 inches thick and cured at 350° F. to 400° F. under a 150 psi load for one hour.

The material of FIGS. 11 and 12 is a 0.028 inch thick, single layer, plain weave, rayon based, graphite fabric densified by batch process and manufactured by the Engineering Systems Division of the B. F. Goodrich Company.

With respect to the Brubaker mechanism, it should suffice to say that mechanism 11 is rotatably supported in an unshown differential housing, that the housing defines a reservoir containing an oil for lubricating the mechanism in a conventional manner, and that mechanism 11 includes an input ring gear 80 secured to a rotatable casing 82, a differential gear train 84, and a pair of clutch assemblies 86 and 88. Casing 82 includes left and right casing members 90 and 92 secured together by a plurality of bolts 94, a pair of support portions 90a and 92a adapted to be received for rotation in bearings of the differential housing, not shown, and annular thrust surfaces 90b and 92b defining a chamber 96 for gear train 84 and clutch assemblies 86 and 88.

The purpose of gear train 84 is to transmit rotary motion from casing 82 to a pair of output shafts 98 and 100. To accomplish this purpose, the gear train includes a pair of beveled side gears 102 and 104 and two or more beveled pinion planetary gears 106 disposed between and in meshing engagement with the side gears. Each pinion gear is rotatably supported in casing 82 by a pinion shaft 108. Side gears 102 and 104 are slideably splined to their respective output shafts and define annular thrust surfaces 102a and 104a.

Clutch assemblies 86 and 88 each include a plurality of interleaved discs 110 and 112 interposed between the respective annular thrust surfaces defined by the side gears and the casing members. Discs 110 are slideably splined to the respective output shaft and discs 112 are slideably splined to casing 82 in a manner similar to the way tabs 54 are received by recesses 56 in FIG. 7.

Disposed between the inboard faces of the side gears is a pair of retention devices 114 and 116 which cooperate with circumferential grooves 98a and 100a in shafts 98 and 100 in a manner to prevent withdrawal of the shafts from the differential case. Biasing springs 118 and 120 are provided between the retention devices to exert a preload force on the side gears to urge the clutch discs into engagement so that the discs will transmit a predetermined amount of torque from the casing to the output shafts or tend to rotate both output shafts even when there is little or no reaction force provided by one of the output shafts. The clutch discs are further biased into engagement in proportion to the amount of torque being transmitted to the side gears by the pinions due to parting forces resulting between pinion gear teeth in mesh with slide gear teeth.

Discs 110 and 112, like discs 48, 50, 60 and 62, are flat steel discs having relatively smooth, oppositely facing, annular surfaces 110a and 112a. Surfaces 112a have the pyrolytic carbon composite material 78' bonded thereon to define annular friction surfaces 78a' which in general runs agains surfaces 110a. Alternately, material 78' may also be bonded to surface 110a. However, since the space available for the discs is limited, as with the locking differential, it is desirable to make the discs as thin as possible so that the clutch assemblies will contain as many discs as possible and thus provide more friction surface area. Material 78' is the same as material 78 described in connection with the locking differential and is bonded to the discs in the same manner.

The preferred embodiments of the invention have been disclosed for illustrative purposes. Many variations and modifications of the preferred embodiments are believed to be within the spirit of the invention. For example, the single woven layers of the quickly densified material of FIGS. 9–12 may include two or three tightly interwoven layers of fabric or may be a felt cloth of carbon or graphite fibers. The following claims are intended to cover the inventive portions of the preferred embodiments and modifications believed to be within the spirit of the invention.

What is claimed is:

1. A friction material comprising:
    a meshed cloth substrate having a discernible surface texture formed of carbon fibers; and
    a coating of carbon deposited on said fibers by chemical vapor deposition to a level forming a friction material having a relatively open mesh with the discernible surface texture of said substrate being substantially the same after said coating is applied.

2. The material of claim 1, wherein said carbon fibers are woven into a single layer of cloth.

3. The material claims 1 or 2, wherein the thickness of said material is less than 0.080 inches.

4. The friction material of claim 1, wherein said coated friction material is relatively flexible.

5. The friction material of claim 1, wherein many of said coated fibers defining the texture of the coated material have relatively large video therebetween.

6. The friction material of claim 5, wherein said coated friction material is relatively flexible.

7. In a clutch or brake device including at least two members mounted for relative rotation, each member having a friction surface rotatable therewith and confronting each other, means to frictionally engage said confronting surfaces to retard said relative rotation, and a cooling liquid in contact with said confronting surfaces, the improvement comprising:
    a pyrolytic carbon composite friction material defining at least one of said confronting surfaces, said friction material including
        a meshed cloth substrate having a discernible surface texture formed of carbon fibers, and
        a coating of carbon deposited on said fibers by chemical vapor deposition to a level forming a friction material having a relatively open mesh with the surface texture of said substrate being substantially the same after said coating is applied.

8. The friction material of claim 7, wherein said coated friction material is relatively flexible.

9. The friction material of claim 7, wherein many of said coated fibers defining the texture of the coated material have relatively large voids therebetween.

10. The friction material of claim 9, wherein said coated friction material is relatively flexible.

11. In a clutch or brake device including at least two members mounted for relative rotation, each member having a friction surface rotatable therewith and confronting each other, means to frictionally engage said confronting surfaces to retard said relative rotation, and a cooling liquid in contact with said confronting surfaces, the improvement comprising:
    a pyrolytic carbon composite friction material defining at least one of said confronting surfaces, said friction material including
        a meshed cloth substrate formed of carbon fibers woven into a single layer of cloth having a discernible surface texture, and
        a coating of carbon deposited on said fibers by chemical vapor deposition to a level forming a friction material having a relatively open mesh with the surface texture of said weave being substantially the same after said coating is applied.

12. The friction material of claim 11, wherein said coated friction material is relatively flexible.

13. The friction material of claim 11, wherein many of said coated fibers defining the texture of the coated material have relatively large voids therebetween.

14. The friction material of claim 13, wherein said coated friction material is relatively flexible.

15. In a clutch or brake device including at least two members mounted for relative rotation, each member having a friction surface rotatable therewith and confronting each other, and means to frictionally engage said confronting surfaces to retard said relative rotation, the improvement comprising:
    a pyrolytic carbon composite friction material defining at least one of said confronting surfaces, said friction material including
        a meshed circuit substrate having a discernible surface texture formed of carbon fibers, and
        a coating of carbon deposited on said fibers by chemical vapor deposition to a level forming a friction material having a relatively open mesh with the surface texture of said substrate being substantially the same after said coating is applied.

16. The friction material of claim 15, wherein said coated friction material is relatively flexible.

17. The friction material of claim 15, wherein many of said coated fibers defining the texture of the coated material have relatively large voids therebetween.

18. The friction material of claim 17, wherein said coated friction material is relatively flexible.

19. In a clutch or brake device including at least two members mounted for relative rotation, each member having a friction surface rotatable therewith and confronting each other, and means to frictionally engage said confronting surfaces to retard said relative rotation, the improvement comprising:
    a pyrolytic carbon composite friction material defining at least one of said confronting surfaces, said friction material including
        a meshed cloth substrate formed of carbon fibers woven into a single layer of cloth having a discernible surface texture, and
        a coating of carbon deposited on said fibers by chemical, vapor deposition to a level forming a friction material having a relatively open mesh with the surface texture of said weave being substantially the same after said coating is applied.

20. The friction material of claim 19, wherein said coated friction material is relatively flexible.

21. The friction material of claim 19, wherein many of said coated fibers defining the texture of the coated material have relatively large voids therebetween.

22. The friction material of claim 21, wherein said coated friction material is relatively flexible.

23. The device of claims 7, 11, 15, or 19, wherein the thickness of said material is less than 0.080 inches.

24. The device of claims 7, 11, 15, or 19, wherein said material, after said chemical vapor deposition, is bonded to said at least one member by an adhesive which penetrates said mesh to improve the bond between said material and said member.

25. The device of claims 7, 11, 15 or 19, wherein said members are formed of a metallic material and wherein the other of said confronting surfaces is defined by said metallic material.

26. The device of claim 23, wherein said carbon material, after said chemical vapor deposition, is bonded to said at least one member by an adhesive which penetrates said mesh to improve the bond between said carbon material and said at least one member.

27. The device of claim 23, wherein said members are formed of a metallic material and the other of said confronting surfaces is defined by said metallic material.

28. In a differential including a casing mounted for rotation in a liquid lubricant bath, first and second side gears mounted for rotation in the casing for rotation relative to each other and relative to the casing, first and second sets of interleaved metal discs respectively rotatable with the casing and at least one of said gears and having mutually facing friction surfaces lubricated by said liquid, means for frictionally engaging said mutually facing surfaces to retard said relative rotation, one of each mutually facing friction surfaces defined by the metal defining its respective disc, the improvement comprising:
 a pyrolytic carbon composite friction material defining the other of each mutually facing friction surfaces, said material including:
 a meshed clutch substrate having a discernible surface texture formed of carbon fibers, and
 a coating of carbon deposited on said fibers by chemical vapor deposition to a level forming a friction material having a relatively open mesh with the surface texture of said substrate being substantially the same after said coating is applied.

29. The differential of claim 28, wherein said carbon fibers are woven into a single layer of cloth.

30. The differential of claim 28, wherein said carbon fibers are woven into a single layer of cloth and wherein the thickness of said material is less than 0.080 inches.

31. The differential of claims 28, 29, or 30, wherein said material, after said chemical vapor deposition, is bonded to its respective discs by an adhesive which penetrates said mesh to improve the bond between said material and the respective discs.

32. The friction material of claim 28, wherein said coated friction material is relatively flexible.

33. The friction material of claim 28, wherein many of said coated fibers defining the texture of the coated material have relatively large voids therebetween.

34. The friction material of claim 33, wherein said coated friction material is relatively flexible.

35. In a clutch or brake device including at least two relatively rotatable members with confronting surfaces functionally engagable to retard the relative rotation therebetween; a cooling liquid in communication with the surfaces; and at least one of said surfaces being defined by a friction material formed from a carbon fiber substrate having a porous surface, the substrate having a given mesh and being coated with carbon deposited thereon by chemical vapor deposition; the improvement characterized by said friction material retaining a substrate amount of said surface porosity and mesh after said chemical vapor deposition, and said friction material being bonded to one of said members after said chemical vapor deposition.

36. The device of claim 35, characterized by said substrate having a surface texture discernable to the naked eye before and after said chemical vapor deposition.

37. The device of claim 35, characterized by said substrate having a given flexibility and compressibility prior to said chemical vapor deposition and retaining a substantial amount of said flexibility and compressibility after said chemical vapor deposition.

38. In a clutch or brake device including at least two relatively rotatable members with confronting surfaces frictionally engageable to retard the relative rotation therebetween; a cooling liquid in communication with the surfaces; and at least one of said surfaces being defined by a friction material formed from a woven carbon fiber substrate having a given surface porosity and mesh and being coated with carbon deposited thereon by chemical vapor deposition; the improvement characterized by said substrate being a single woven layer retaining a substantial amount of said given surface porosity and mesh after said chemical vapor deposition; and said friction material being bonded to one of said members after said chemical vapor deposition.

39. The device of claim 38, characterized by said substrate having a surface texture defined by said weave and discernible to the naked eye before and after said chemical vapor deposition.

40. The device of claim 38, characterized by said substrate having a given flexibility and compressibility prior to said chemical vapor deposition and retaining a substantial amount of said flexibility and compressibility after said chemical vapor deposition.

41. A clutch or brake device including at least two relatively moveable members frictionally engaged through a friction material interposed between the members for retarding the relative movement, the friction material comprising:
 a meshed cloth substrate having a discernible surface texture formed of carbon fibers; and
 a coating of carbon deposited on said fibers by chemical vapor deposition to a level forming a friction material having a relatively open mesh with the discernible surface texture of said substrate being substantially the same after said coating is applied.

42. The device of claim 41, wherein said friction material is affixed to one of the members.

43. The device of claim 41, wherein said carbon fibers are woven into a single layer of cloth.

44. The device of claim 43, wherein said friction material is affixed to one of the members.

* * * * *